E. CRANE.
Car Truck.
No. 26,166.
Patented Nov. 22, 1859.
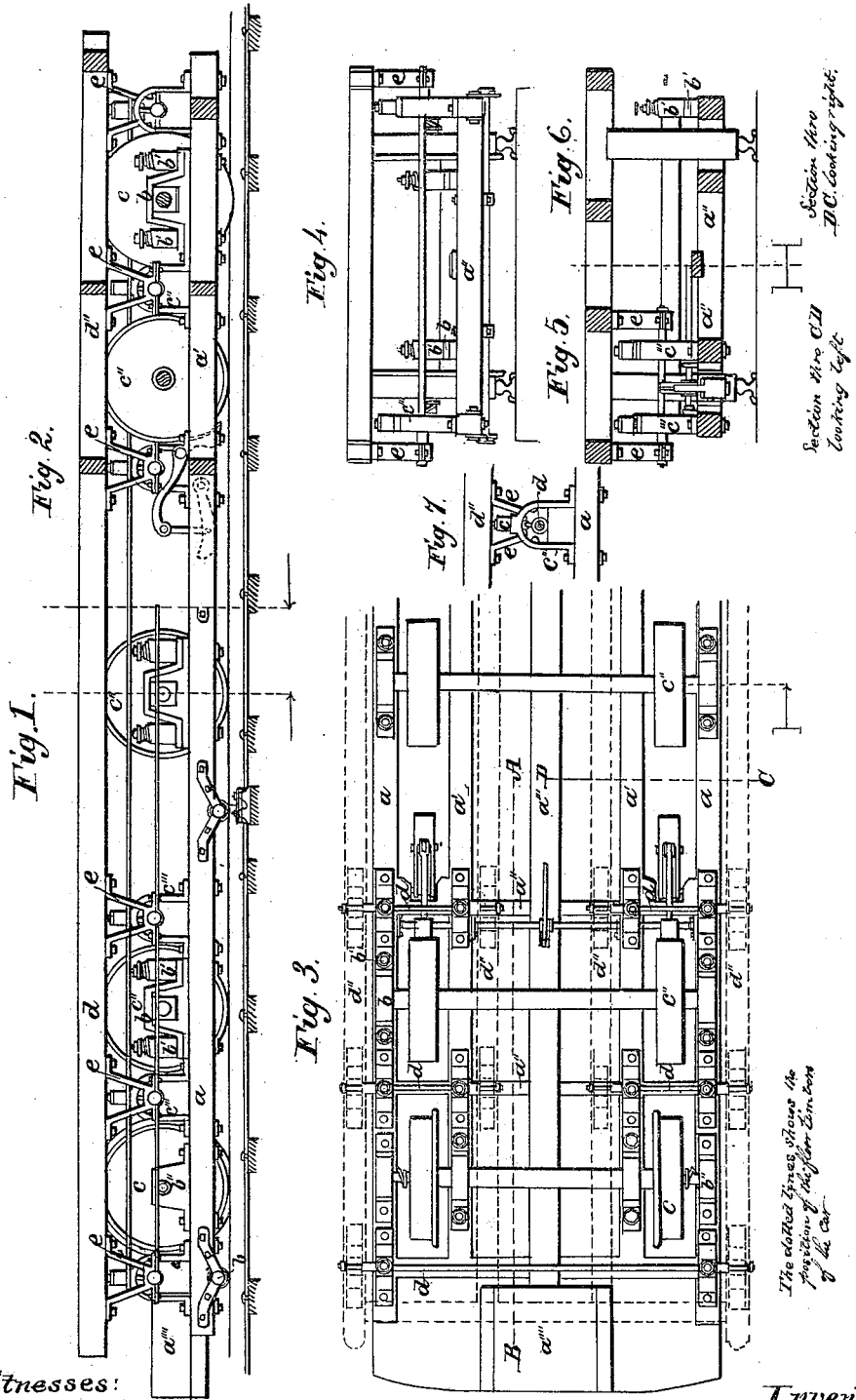

UNITED STATES PATENT OFFICE.

EDWARD CRANE, OF DORCHESTER, MASSACHUSETTS.

RAILROAD-CAR.

Specification of Letters Patent No. 26,166, dated November 22, 1859.

*To all whom it may concern:*

Be it known that I, EDWARD CRANE, of Dorchester, in the county of Norfolk and State of Massachusetts, have invented a new and useful Improvement in Railroad-Cars; and I hereby declare the following is a true and exact description thereof.

My improvement consists in providing a single long truck the frame of which is suspended underneath the axles of the wheels and upon which truck the body of the car is placed and supported in such a manner as to distribute its weight between several points through the whole length of the truck and allow the body of the car to swing freely in a horizontal plain.

The following is a full description of my improvement and the mode of constructing the car, the drawings annexed exhibit the principal parts represented from different points of view.

Figure 1 is a side elevation of one half the truck and the lower timber of the frame of the body of the bar. Fig. 2, is a longitudinal section of half the truck with the lower timber of the body of the car through A, B, as seen in Fig. 3. Fig. 3, is a plan of one half the truck showing the frame of the truck, the wheels and axles, the bars for supporting the body of the car, the springs regulating the movement of the flange wheels and platform and step for entering the car, these parts are represented by the dark parts of the drawing, the light brown tints represent the position of the floor timbers of the body of the car. Fig. 4, is an end elevation of the truck and lower timber of the car. Fig. 5, is a section of one side of the truck and lower timbers of the car through C, D—in Fig. 3— looking to the left. Fig. 6, is a similar section looking to the right. Fig. 7, is a view of the supports and bearings for suspending the car upon the truck.

The frame of the truck is constructed with 4 pieces of timber about 4 inches thick by 8 inches wide and as long as the truck. One of these timbers is represented by —$a$— in Fig. 1, another by $a'$, in Fig. 2, and the whole 4 are represented in Fig. 3, by $a$, and $a$. They are secured together by cross pieces of the same width and thickness into which they are framed and bolted. These cross pieces are shown in Fig. 3, by parts marked $a'$, and in Figs. 4, 5 and 6, some of the cross pieces are marked $a''$. This frame is suspended below the axles or journals of the wheels by means of brackets $b$ and the springs $b'$. These brackets and springs are seen in Figs. 1, 2, 3, 4 and 6. The brackets contain the boxes in which the journals of the wheels run and they are placed on the upper side of the truck frame and secured to it by long bolts passing through the timber $a$ and $a'$, and extending upward far enough to allow a spring to be placed between the end of the bracket through which the bolt passes and a nut or collar at the upper end of the bolt in such manner as to allow the truck frame a suitable degree of vertical movement. The most convenient springs to use in this place are the india-rubber or coiled steel springs but the elliptic springs might be used.

The bottom of the truck frame should be entirely covered with sheet iron or boards, so as to exclude the dust, except the space for the wheels and brakes. The wheels run between the timbers $a$ and $a'$. The pair of wheels at each end are made with flanges in order to serve as guide wheels and I prefer to place the brackets and springs by which they are connected to the truck frame upon the inner timbers $a'$. The journals of these wheels are so made as to allow a lateral movement in the boxes of 2 or 3 inches—on the outer timber $a$ is placed a somewhat similar bracket on the inside of which is a circular hole about 6 inches in diameter with a hole in the center of the bottom sufficiently large to admit the spindle or cylindrical bar of iron allowing it to vibrate up and down; the head of this spindle is made conical to fit a conical boring or depression corresponding to it in the end of the axle against which it is made to bear by a volute steel spring or india rubber spring through which the spindle or bolt passes one end of the spring bearing against the head of the bolt and the other against the bottom of the hole in the bracket in which the spring and spindle are placed.

On the end of the spindle which passes through the small hole in the bracket is placed a nut for the purpose of drawing the spring so as to relieve the spindle from the wheel to admit the wheel to be removed or put in its place—the nut may then be removed.

The intermediate wheels—$c$—may be varied in number and are flat wheels with the brackets and springs $b$ and $b'$ placed upon the outside timbers $a$ of the truck frame and secured to it by long bolts passing through the timbers $a$—and extending upward far enough to allow a spring to be placed between the end of the bracket through which the bolt passes and a nut or collar at the upper end of the bolt in such manner as to allow the truck frame a suitable degree of vertical movement. The flat wheels next to the flange wheels should be slightly conical to assist them in following the flange wheels around curves.

Under the truck frame are placed 4 or more cross bars of round iron confined to the truck frame by boxes so as to roll freely in the same as shown by $b'''$, in Fig. 1, for the purpose of preventing injury to the car should the wheels leave the track.

At each end of the truck frame underneath the bunter is placed a platform with a movable step over the bunter as shown by $a''''$, Figs. 1, and 3. The bunters are placed as usual upon the plank or draw bar $a'''$ Fig. 3 between the platform and movable step. Upon the truck frame is placed on the top of the string pieces $a$, and $a'$, a sufficient number of arched pedestals $c'''$ Figs. 1, 2, 4, 5 and 7 so as to distribute the weight of the car upon the truck frame, from the top of which is suspended by bolts springs and chains $c''''$, bars of round iron $d$, Figs. 3 and 7. On these bars the bottom of the car represented by the 4 string pieces $d''$, (that are to be sufficiently secured by cross pieces $d'$ as at the ends) rest by means of inverted pedestals—$e$, or their equivalent sufficient to sustain the body of the car and give it an easy movement in all directions.

The brakes as represented on the model and drawings are what I intend to apply for for Letters Patent hereafter, but any of the known mode of brakes may be applied to this car, as well as any other.

What I claim is—

1. The use of a single long truck for the support of a rail road car, when the frame of said truck is constructed and suspended substantially as herein described.

2. I claim the use of cylindrical bars of iron passing across under the frame of the truck and nearly in contact with the rails for the purpose of keeping the truck frame from striking the rails or ground in case the car leaves the track.

EDWARD CRANE.

Attest:
 JOHN S. HOLLINGSHEAD,
 JOHN DOWLING.